US009796133B2

(12) United States Patent
Silvanus et al.

(10) Patent No.: US 9,796,133 B2
(45) Date of Patent: Oct. 24, 2017

(54) WELDING TOOL COMPRISING A ROTATING PROBE, WELDING METHOD AND WORKPIECE

(75) Inventors: Juergen Silvanus, Munich (DE); Erich Forster, Grossaitingen (DE); Eric Tauscher, Augsburg (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 910 days.

(21) Appl. No.: 14/126,241

(22) PCT Filed: Jun. 1, 2012

(86) PCT No.: PCT/DE2012/000577
§ 371 (c)(1),
(2), (4) Date: Jul. 11, 2014

(87) PCT Pub. No.: WO2012/171523
PCT Pub. Date: Dec. 20, 2012

(65) Prior Publication Data
US 2014/0326392 A1 Nov. 6, 2014

(30) Foreign Application Priority Data
Jun. 15, 2011 (DE) .......................... 10 2011 106 506

(51) Int. Cl.
*B32B 37/00* (2006.01)
*B29C 65/06* (2006.01)
*B23K 20/12* (2006.01)

(52) U.S. Cl.
CPC .......... *B29C 65/06* (2013.01); *B23K 20/1245* (2013.01); *B23K 20/1255* (2013.01); *B23K 20/1265* (2013.01)

(58) Field of Classification Search
CPC .......................... B29C 65/06; B23K 20/1245; B23K 20/1255; B23K 20/1265; B23K 20/127
USPC ...................................... 156/73.5
See application file for complete search history.

(56) References Cited

U.S. PATENT DOCUMENTS

| 3,821,048 | A | * | 6/1974 | Acker | ..................... B29C 65/08 156/157 |
|---|---|---|---|---|---|
| 5,718,366 | A | | 2/1998 | Colligan | |
| 6,138,895 | A | | 10/2000 | Oelgoetz et al. | |
| 6,199,745 | B1 | | 3/2001 | Campbell et al. | |
| 6,758,382 | B1 | | 7/2004 | Carter | |

(Continued)

FOREIGN PATENT DOCUMENTS

| EP | 1 872 893 B1 | 1/2008 |
|---|---|---|
| EP | 2 255 918 A1 | 12/2010 |

OTHER PUBLICATIONS

International Search Report with English translation dated Feb. 11, 2013 (9 pages).

(Continued)

*Primary Examiner* — James Sells
(74) *Attorney, Agent, or Firm* — Crowell & Moring LLP

(57) ABSTRACT

A welding tool for joining at least two workpieces at a joining region by friction stir welding includes a tool pin arranged along one axis of the welding tool, for applying frictional heat to the workpieces. The welding tool also includes a shoulder surrounding the tool pin, for separating the joining region from the surrounding area. The shoulder is moveable essentially parallel to the axis of the welding tool.

11 Claims, 2 Drawing Sheets

(56) References Cited

U.S. PATENT DOCUMENTS

Figure 1:
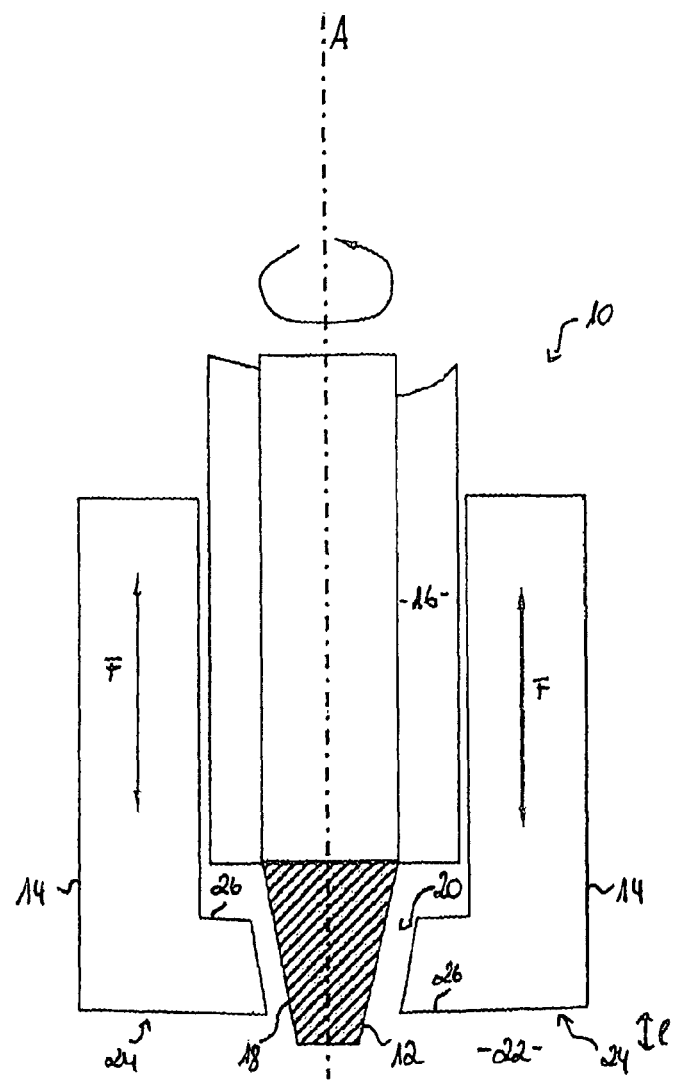

2007/0057015 A1     3/2007   Colligan
2008/0099533 A1     5/2008   Hanlon et al.
2008/0296350 A1    12/2008   Henneboehle et al.

OTHER PUBLICATIONS

German Office Action dated Jan. 10, 2013 (5 pages).
European Office Action issued in European counterpart application No. 12 740 292.3-1702 dated Mar. 17, 2017 (Four (4) pages).

\* cited by examiner

WELDING TOOL COMPRISING A ROTATING PROBE, WELDING METHOD AND WORKPIECE

BACKGROUND AND SUMMARY OF THE INVENTION

Exemplary embodiments of the invention relate to a welding tool for joining at least two workpieces at a joining region by means of friction stir welding.

In contrast to the friction welding process, the friction energy in the friction stir welding process is not generated due to the rotation of one of the two workpieces, which are to be joined, relative to the other workpiece, but rather a wear-resistant welding tool is used. This wear-resistant welding tool applies the rotational energy simultaneously to both workpieces. This process comprises the following steps.

In the first step the welding tool comprising a rotating tool pin is pressed with high force between the two workpieces to be joined, until a shoulder, which surrounds the tool pin and is a part of the welding tool, comes to rest on the surface of the workpieces.

In the second step the rotating tool pin remains for a short period of time at the insertion point, as a result of which the area between the shoulder of the welding tool and the workpieces heats up to just below the melting point of the workpieces. At the same time the material of the workpieces becomes soft and is plasticized, so that a mixing of the materials of the workpieces, which are to be joined, in the joining region is possible.

In the third step the welding tool is moved in the feed direction in such a way that the shoulder continues to be pressed with considerable force onto the workpiece surface, so that the tool pin is pressed into the joining region. During the feed motion, a pressure difference between the front portion of the welding tool and its rear side is generated due to the rotational movement of the tool pin, so that plasticized material is conveyed around the tool pin, mixes and, thus, helps to form the weld seam.

The welding tool is extracted from the joining region at the end of the weld seam.

Working on this basis, the welding tool comprises a tool pin and, arranged more or less perpendicular to the tool pin, a shoulder with a larger diameter than the tool pin itself. The shoulder serves the purpose of isolating the surrounding air from the weld seam, whereas the tool pin is responsible for the swirling of the material. Since the material is entrained by the swirling in order to form the weld seam, there is no need for additional materials. Furthermore, it is also possible to dispense with a protective gas atmosphere.

However, the drawback is that an end-of-the weld crater at the end of the weld seam is formed by the extraction of the tool pin. Furthermore, it has also been difficult to weld a welding depth that varies between two workpieces that are to be joined, because it has always been necessary to mount a new tool pin having a different length on the welding tool.

A solution to the aforementioned problems has been to use an automatically retractable tool pin, which can be moved vertically inside a tool pin holder of the welding tool. However, such a solution makes the design of the welding tool more complicated and subject to wear.

Therefore, exemplary embodiments of the present invention are directed to a simple tool design, which is less subject to wear, and to achieve a change in the length of the tool pin.

A welding tool for joining at least two workpieces at a joining region by means of friction stir welding has a tool pin, which is arranged along one axis of the welding tool, for applying frictional heat to the workpieces and a shoulder, which surrounds the tool pin and is provided for separating the joining region from the surrounding area. The shoulder is designed in such a way that it can be moved more or less parallel to the axis.

Since the shoulder is designed to be movable, it is possible to extract the tool pin, which is surrounded by the shoulder, from the shoulder at different tool traversing lengths. As a result, it is possible to achieve different welding depths using one and the same tool pin. Furthermore, with this welding tool even workpieces exhibiting a varying or different joint thickness can be easily connected to each other without interrupting the welding process.

Preferably the shoulder has an elastic area. The advantage of this feature is that then the shoulder can be pushed back parallel to the axis by simply applying force, so that the tool pin protrudes further from the shoulder. As the force decreases, the shoulder expands again, so that the tool pin enters again further into the shoulder, thus enabling in an advantageous way shorter welding depths.

It is even more highly preferred that the elastic area is formed by a spring arrangement. As a result, an elasticity of the shoulder can be achieved in a particularly easy way through the use of heat resistant materials. As an alternative, elastic materials may be provided as a cushion at a suitable location on the shoulder, in order to be able to move said shoulder parallel to the axis through the application of force.

Preferably the elastic area is formed on a shoulder end region that is to be turned toward at least one of the workpieces during normal operation. This arrangement makes it possible to achieve a more stable design of the entire shoulder, so that only the lower portion, i.e. the shoulder end region, exhibits the elastic area, thus making the shoulder movable parallel to the axis.

The tool pin advantageously has, in the direction of the axis, a projection for projecting beyond the shoulder end region. This projection can also be called the end region of the tool pin or the tip of a tool pin.

It is even more preferred that a maximum possible motion path of the shoulder corresponds in essence to the projection of the tool pin beyond the shoulder end region. As a result, it is advantageously possible to insert the tool pin completely into the shoulder, thus cleaning the tool pin by means of the movement. For example, the maximum possible motion path can range from 0 to 10 mm, in particular from 2 to 4 mm.

Furthermore, the tool pin is advantageously mounted on a tool pin holder in a manner allowing it to be removed, so that the tool pin can be removed preferably with ease from the tool pin holder and can be replaced with a new tool pin.

In a preferred embodiment the tool pin holder is mounted in such a way that it can be rotated about the axis. Hence, when the tool pin holder rotates, the tool pin itself automatically rotates along with said tool pin holder. Therefore, a rotatable mounting of the tool pin itself can be preferably dispensed with.

Advantageously the shoulder is integrally formed with the tool pin holder. In such an arrangement the shoulder can rotate simultaneously with the tool pin about the same axis at the same angular speed.

As an alternative, the shoulder may be mounted separately from the tool pin holder in such a way that it can be rotated about the axis; or the shoulder can be arranged in such a way that it is stationary. This arrangement makes it possible to achieve, for example, a different angular speed between the tool pin and the shoulder, or the shoulder may enclose the tool pin rigidly and without rotation.

Preferably the tool pin holder is designed in the shape of a cone in the longitudinal section along the axis. Then the shoulder, which already extends along the tool pin holder in the direction of the axis, can be brought closer to the tool pin at the shoulder end region, as a result of which preferably a better seal against the surrounding air can be achieved.

Therefore, it is advantageous if the shoulder is also constructed in the shape of a cone in the longitudinal section along the axis and/or is formed in essence in the shape of an L.

A welding method, which is provided for joining at least two workpieces having a welding depth, which varies along a joining region, by means of friction stir welding using a welding tool described above, includes the steps:

a) bringing the shoulder in contact with at least one workpiece;

b) applying a force, which is directed more or less parallel to the axis, to the shoulder, until the tool pin has completely penetrated a joining region of said at least two workpieces;

c) changing the force for changing the welding depth of the tool pin in the joining region while the shoulder is in continuous contact with the joining region.

With this method even those workpieces exhibiting a varying or different joint thickness can be easily connected to each other without interrupting the welding process.

Preferably the welding process is followed by a removal of the shoulder from the at least one workpiece and by a displacement of the shoulder parallel to the axis, so that the tool pin can be easily cleaned in this manner.

A workpiece is produced preferably with the welding tool described above and/or with the welding method described above.

BRIEF DESCRIPTION OF THE DRAWING FIGURES

Preferred embodiments of the invention will be explained in detail below with reference to the accompanying drawings. The drawings show in:

FIG. 1 a longitudinal sectional view of a first embodiment of an inventive welding tool for friction stir welding with a tool pin and a shoulder.

Figure 2:
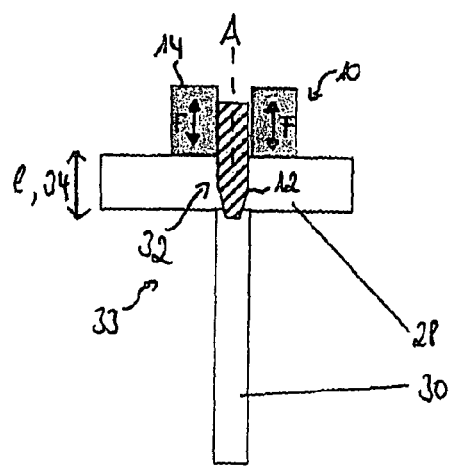

FIG. 2 the welding tool from FIG. 1 when welding a workpiece to a thick workpiece.

Figure 3:
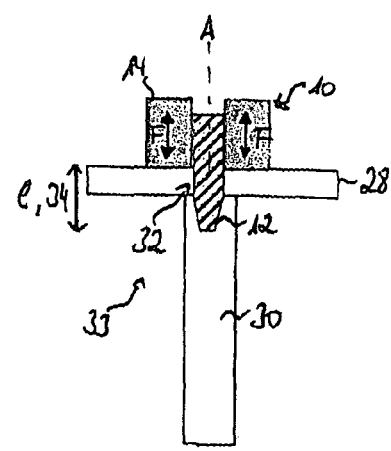
Figure 4:
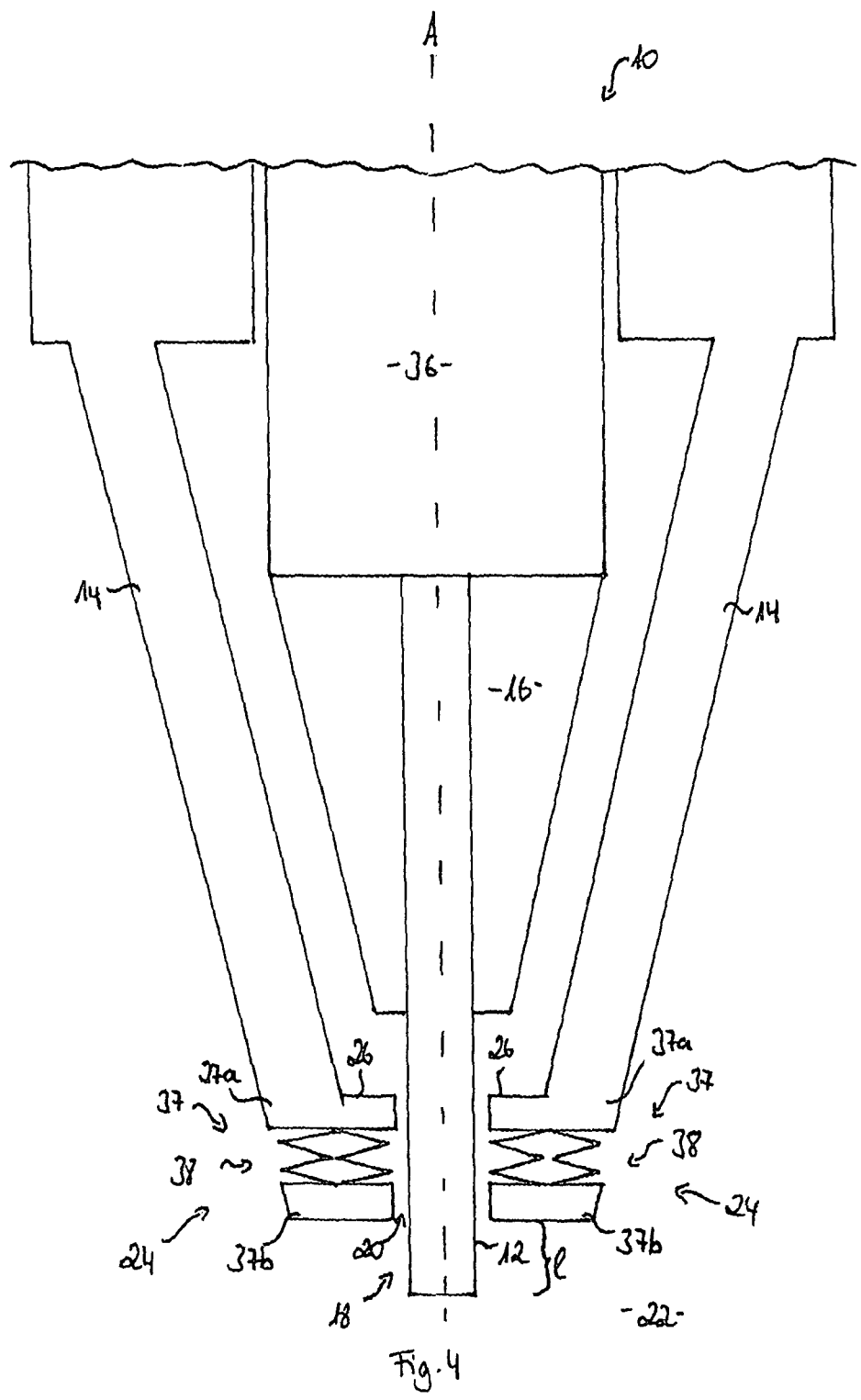

FIG. 3 the welding tool from FIG. 1 when welding a workpiece to a thin workpiece; and FIG. 4 a second embodiment of an inventive welding tool from FIG. 1.

DETAILED DESCRIPTION

FIG. 1 is a longitudinal sectional view of a first embodiment of a welding tool 10 comprising a tool pin 12 and a shoulder 14.

The tool pin 12 is attached to a tool pin holder 16, which is mounted in a manner allowing rotation about an axis A in the direction of the arrow.

In the illustrated embodiment the tool pin holder 16 is designed in the shape of a cylinder; and the tool pin 12 tapers off towards a tool pin end region 18, which projects through a shoulder opening 20 into a surrounding area 22. As a result, the tool pin 12 projects beyond a shoulder end region 24 by a projection I.

The shoulder 14 is arranged separately from the tool pin holder 16 and is movable along the axis A in the direction of the arrow that is shown.

The shoulder 14 is configured in essence as a cylinder shape around the axis A and has an L shape in the longitudinal section. In this case, bars 26, which are directed toward the tool pin 12 and which exhibit an L shape in the longitudinal section, are adapted to the tapering of the tool pin 12.

FIGS. 2 and 3 show a welding process for joining two workpieces 28, 30 in a joining region 32 by means of friction stir welding using the welding tool 10.

In FIG. 2 the first workpiece 28 has a greater thickness than the first workpiece 28 in FIG. 3. The first workpiece 28 in FIG. 2 has, for example, a thickness of 4 mm, whereas the first workpiece 28 in FIG. 3 has, for example, a thickness of 2 mm. Working on this basis, in order to join the workpieces 28, 30 in order to achieve a T shaped end workpiece 33, the tool pin 12 penetrates deeper into the first workpiece 28 in FIG. 2 than in FIG. 3. This is achieved in that the shoulder 14 is movable along the axis A; and, as a result, the tool pin 12 can protrude further from the shoulder 14. Therefore, it is also possible to weld together the workpieces 28, 30, which have welding depths 34 that vary over the joining region 32.

FIG. 4 shows a second embodiment of a welding tool 10.

In this case the tool pin holder 16 as well as the shoulder 14 are formed in the shape of a cone and taper off towards the shoulder end region 24. With the simultaneous L shaped design of the shoulder 14 in the shoulder end region 24, it is now possible to bring the shoulder 14 especially close to the tool pin 12 and, thus, enable a particularly good isolation of the resulting weld seam from the surrounding area 22.

In the embodiment that is shown, the shoulder 14 and the tool pin holder 16 are mounted separately from each other. In this case the tool pin holder 16 can be rotated about the axis A. This feature is achieved by means of a spindle 36, on which the tool pin holder 16 is secured.

The shoulder 14 has an elastic area 37 on the shoulder end region 24, due to the fact that the shoulder end region 24 is divided into two shoulder end subregions 37a, 37b, and a spring arrangement 38 is provided in the space between the shoulder end subregions 37a, 37b. If at this point a force F, which is directed more or less parallel to the axis A, is applied to this spring arrangement 38, the spring arrangement 38 is compressed, and the space between the first shoulder end subregion 37a and the second shoulder end subregion 37b is changed. At the same time the projection I of the tool pin 12 beyond the shoulder 14 also changes. In essence the projection I corresponds to the maximum possible motion path of the second shoulder end subregion 37b, where said maximum possible motion path is defined by the spring arrangement 38.

With the welding tool 10 different joint thicknesses can be joined together by means of friction stir welding.

To date, when welding with a varying joint thickness, the tool pin 12 had to be either changed, and as a result, the welding process had to be interrupted before it could be continued with the modified or rather adapted tool pin 12. As an alternative, a so called retractable tool pin 12 was used that could be moved vertically inside the tool pin holder 16, in order to achieve a change in the length of the tool pin 12.

With the welding tool 10 a change in the length of the tool pin 12 can be achieved not by moving the tool pin 12 inside the tool pin holder 16, but rather the shoulder 14 is designed in such a way that said shoulder can be moved, in particular, at the shoulder end region 24; and/or said shoulder is designed elastically, in particular, at the shoulder end region. The result is a deformation or deflection through the introduction of force. The free length of the tool pin 12 and, thus, the welding depth 34 in the joining region 32 correlate with the degree of deflection or more specifically the amount of deformation.

Therefore, it is not necessary to change the welding tool in the course of welding at one and the same component or workpiece 28, 30. Moreover, a significantly simpler welding tool design is achieved, in order to provide, with such a design, different lengths of the tool pin 12 in the welding tool 10.

In this respect the shoulder 14 can be designed in such a manner that it is rigid and does not rotate or in such a manner that it rotates with the tool pin 12. The tool pin 12 is mounted preferably on a spindle 36, which is rotatably mounted. In this case the tool pin 12 cannot be displaced along the axis A, but rather the shoulder 14 is displaceable. The projection I of the tool pin 12 beyond the shoulder 14 is controlled by the displacement of the shoulder 14 along the axis A.

It is advantageous that the displacement of the shoulder 14 along the axis A is much easier and simpler to implement than a displacement of the tool pin 12, so that the result is a tool pin projection that is simpler, more robust and cheaper. No additional closed loop control is required; the projection I is controlled only by introducing a force.

In addition, it has proven to be advantageous that a cleaning effect is obtained at the end of the welding process through a repeated displacement of the shoulder 14 along the axis A.

As a result, sticking of the welding tool 10, the tool pin 12 or the tool pin holder 16 can be avoided. In this respect, an embodiment of the tool pin holder 16 and the bar 26 with a conical longitudinal section is particularly advantageous.

Different root and flange thicknesses can be connected to each other by means of the variable welding depth 34 of the tool pin 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS 10 welding tool
12 tool pin
14 shoulder
16 tool pin holder
18 tool pin end region
20 shoulder opening
22 surrounding area
24 shoulder end region
26 bar
28 first workpiece
30 second workpiece
32 joining region
33 end workpiece
34 welding depth
36 spindle
37 elastic area
37a first shoulder end subregion
37b second shoulder end subregion
38 spring arrangement
A axis
I projection
F force

The invention claimed is:

1. A welding tool for joining at least two workpieces at a joining region by friction stir welding, the welding tool comprising:
   a tool pin arranged along one axis of the welding tool, wherein the tool pin is configured to apply frictional heat to the workpieces at the joining region during the friction stir welding; and
   shoulder surrounding the tool pin, wherein the shoulder is arranged to separate the joining region from a surrounding area, wherein the shoulder is configured to be moveable parallel to the one axis,
   wherein the tool pin has, in a direction of the one axis, a projection that projects beyond the shoulder end region,
   wherein the projection is controlled by a displacement of the shoulder parallel to the one axis.

2. The welding tool of claim 1, wherein the shoulder has an elastic area.

3. The welding tool of claim 2, wherein the elastic area is formed by a spring arrangement.

4. The welding tool of claim 2, wherein the elastic area is formed on a shoulder end region that faces at least one of the workpieces during normal operation.

5. The welding tool of claim 1, wherein a maximum possible motion path of the shoulder corresponds to the projection.

6. The welding tool of claim 1, wherein the tool pin is removably mounted on a tool pin holder.

7. The welding tool of claim 6, wherein the tool pin holder is rotatably mounted about the one axis.

8. The welding tool of claim 6, wherein the shoulder is integrally formed with the tool pin holder.

9. The welding tool of claim 6, wherein the shoulder is mounted separately from the tool pin holder in such a way that the shoulder is rotatable about the one axis or in such a way that the shoulder is stationary.

10. The welding tool of claim 6, wherein the tool pin holder has a cone shape in a longitudinal section along the one axis.

11. The welding tool as claimed in claim 1, wherein the shoulder has a cone shape in a longitudinal section along the one axis or has an L shape.

* * * * *